US007233357B1

(12) United States Patent
Ohkubo

(10) Patent No.: US 7,233,357 B1
(45) Date of Patent: Jun. 19, 2007

(54) IMAGE PICKUP APPARATUS WITH IMAGE EVALUATION

(75) Inventor: Toshiyuki Ohkubo, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/466,046

(22) Filed: Dec. 17, 1999

(30) Foreign Application Priority Data

Dec. 22, 1998 (JP) .................................. 10-376184
May 26, 1999 (JP) .................................. 11-146264

(51) Int. Cl.
*H04N 5/222* (2006.01)

(52) U.S. Cl. ............................. 348/333.04; 348/223.1; 348/364

(58) Field of Classification Search ........... 348/207.99, 348/222.1, 223.1, 224.1, 225.1, 229.1, 234, 348/241, 242, 333.01, 333.11, 333.12, 345, 348/347, 349, 351, 352, 354–356, 362–364, 348/371, 230.1, 333.04
See application file for complete search history.

(56) References Cited

U.S. PATENT DOCUMENTS

| | | | | |
|---|---|---|---|---|
| 4,750,032 A | * | 6/1988 | Nakayama | 348/225.1 |
| 4,811,086 A | * | 3/1989 | Hieda | 348/227.1 |
| 4,890,166 A | * | 12/1989 | Kimura et al. | 348/224.1 |
| 5,438,363 A | * | 8/1995 | Ejima et al. | 348/223.1 |
| 5,555,022 A | * | 9/1996 | Haruki et al. | 348/223.1 |
| 5,568,194 A | * | 10/1996 | Abe | 348/223.1 |
| 5,710,954 A | * | 1/1998 | Inoue | 396/374 |
| 5,808,681 A | * | 9/1998 | Kitajima | 348/371 |
| 6,266,083 B1 | * | 7/2001 | Sakaegi et al. | 348/207.99 |
| 6,337,951 B1 | * | 1/2002 | Nakamura | 348/231.99 |
| 6,359,649 B1 | * | 3/2002 | Suzuki | 348/220.1 |
| 6,493,027 B2 | * | 12/2002 | Ohta et al. | 348/223.1 |
| 6,570,614 B1 | * | 5/2003 | Kubo et al. | 348/231.6 |
| 6,760,065 B1 | * | 7/2004 | Whitcher | 348/333.01 |
| 6,982,753 B1 | * | 1/2006 | Udagawa | 348/223.1 |
| 7,071,987 B1 | * | 7/2006 | Tanaka | 348/362 |
| 2004/0126098 A1 | * | 7/2004 | Kim et al. | 386/117 |

FOREIGN PATENT DOCUMENTS

| | | | | |
|---|---|---|---|---|
| JP | 60220671 A | * | 11/1985 | |
| JP | 62023025 A | * | 1/1987 | |
| JP | 01165267 A | * | 6/1989 | |

* cited by examiner

*Primary Examiner*—Vivek Srivastava
*Assistant Examiner*—Jason Whipkey
(74) *Attorney, Agent, or Firm*—Morgan & Finnegan, LLP

(57) ABSTRACT

An image capture apparatus includes an image capture unit adapted to capture an image using an image pickup element, a switch adapted to instruct the image capture apparatus to start a recording process of recording a captured image to a recording medium, and a control unit adapted to determine, using a first white balance value indicating a white balance of an image captured before the switch is operated and a second white balance value indicating a white balance of an image captured after the switch is operated, whether to issue a warning to a user or not, wherein the warning allows the user to determine whether to store the captured image in the recording medium.

8 Claims, 7 Drawing Sheets

IMAGE PICKUP APPARATUS WITH IMAGE EVALUATION

BACKGROUND OF THE INVENTION

1. Field of the Invention

The present invention relates to an image pickup apparatus for picking up a still image or a moving image.

2. Description of Related Art

Conventionally, there is known an image processing apparatus (image pickup apparatus), such as an electronic camera, which automatically performs a distance measuring process, a light measuring process and a color measuring process.

In the image processing apparatus of this kind, a photographer himself/herself is not required to adjust a focus and/or an exposure, and the photographer is enabled to conduct a desirable photo-taking operation regardless the kind of incident light even when the light sources of different illuminances are made to enter the image processing apparatus.

In the above-mentioned conventional image processing apparatus, an object image is picked up after the distance measuring, light measuring and color measuring processes are automatically performed. However, in a case where the state of incident light has changed at a point of time between each of the distance measuring, light measuring and color measuring processes and a photo-taking operation, for example, when light of an automobile has suddenly come into the field of view of an image-taking lens, an exposure or a white balance would deviate from an appropriate value, and as a result, there is a problem that a photo-taking operation would be performed on the basis of the deviating exposure or white balance.

Further, in a case where the photographer performs a photo-taking operation in a state in which the object is moving or the apparatus is vibrating due to the shake of the hand of the photographer, the photo-taking operation for obtaining image data is peformed while the object image is in an out-of-focus state, and thus there is a problem that image data for the out-of-focus object image would be recorded in a recording part as it stands.

BRIEF SUMMARY OF THE INVENTION

In accordance with one aspect of the invention, there is provided an apparatus comprising an image pickup device which picks up an object image, an instruction device which gives an instruction for causing the image pickup device to pick up an object image for photo-taking, and an evaluation device which, on the basis of (i) a state of an object existing before the image pickup device picks up an object image for photo-taking in response to the instruction of the instruction device and (ii) an object image picked up by the image pickup device for photo-taking, evaluates the object image, so that it is possible to readily discern the lowering of image quality of picked-up image data caused when the state of an object has changed between before the photo-taking operation and after the photo-taking operation.

The above and further aspects and features of the invention will become apparent from the following detailed description of a preferred embodiment thereof taken in conjunction with the accompanying drawings.

DETAILED DESCRIPTION OF THE INVENTION

Hereinafter, a preferred embodiment of the invention will be described in detail with reference to the drawings.

Figure 1:
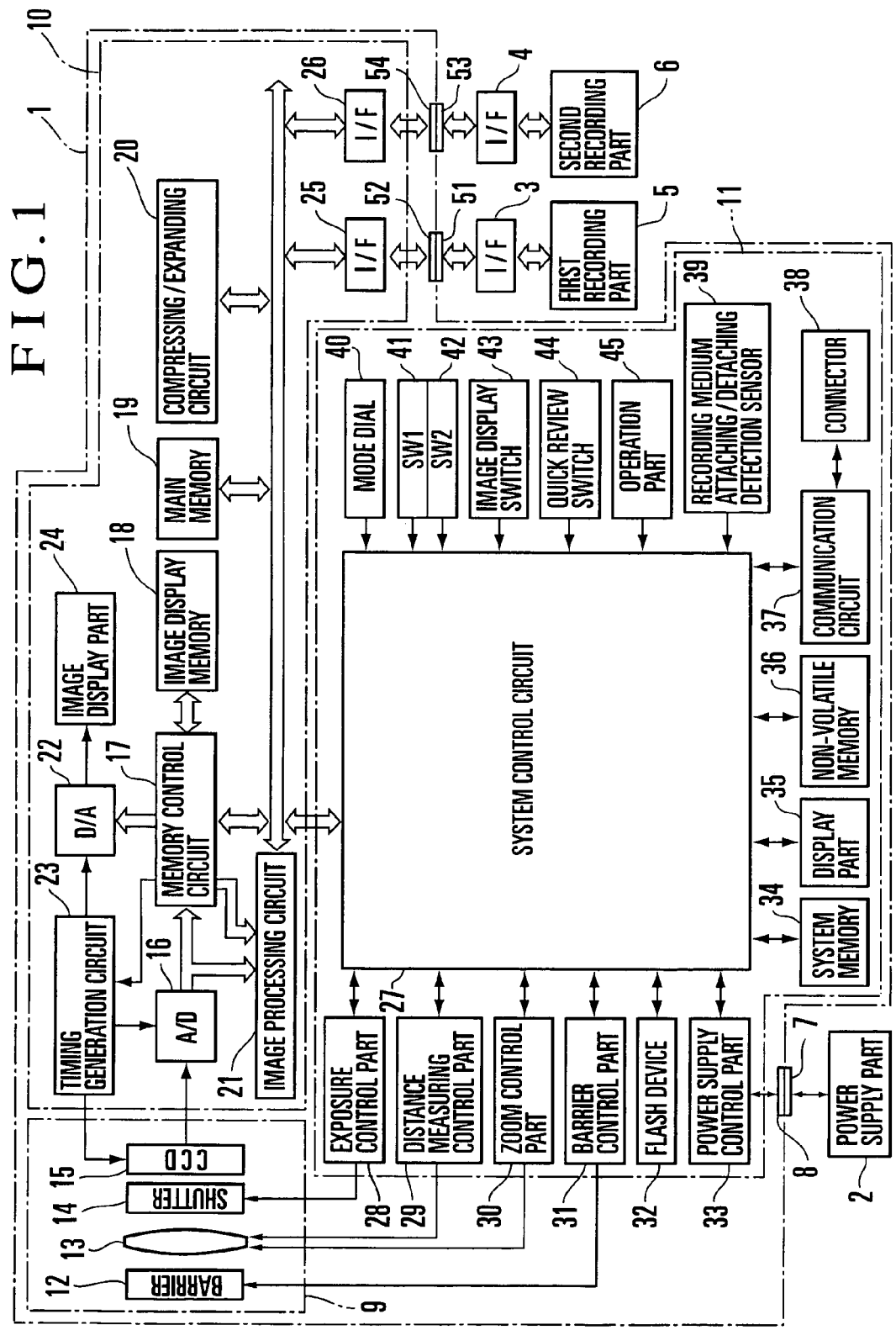
FIG. 1 is a block diagram showing the arrangement of an image processing apparatus according to an embodiment of the invention.

FIG. 1 is a block diagram showing the arrangement of an image processing apparatus according to the embodiment of the invention. Referring to FIG. 1, the image processing apparatus is provided with an image processing part 1 for performing a predetermined image processing for picked-up image data, and for performing a control of photo-taking conditions, a power supply part 2 composed of a primary battery, such as an alkaline battery, a lithium battery or the like, and a secondary battery, such as a NiCd battery, a NiMH battery or the like, for supplying electric power to the image processing part 1, first and second recording parts 5 and 6 composed of a memory card or a hard disk or the like, which are connected to the image processing part 1 through interface (I/F) parts 3 and 4, respectively.

Then, the power supply part 2 and the image processing part 1 are electrically connected to each other through connectors 7 and 8, and the I/F parts 3 and 4 connected to the first and second recording parts 5 and 6 and the image processing part 1 are electrically connected to each other through connectors 51 to 54. Incidentally, although the above-mentioned power supply part 2 is composed of the battery in the present embodiment, it may be composed of another power supply means such as an AC adapter or the like.

The above-mentioned image processing part 1 includes an image pickup system block 9 on which an optical image of an object is made incident, an image processing block 10 for implementing a predetermined image processing to an output signal from the image pickup system block 9, and a system control block 11 for managing a system control of the whole image processing apparatus.

The above-mentioned image pickup system block 9, more concretely, includes a barrier 12 for preventing a contamination that may be attached to the image pickup system block 9 or a fracture of the image pickup system block 9, an image pickup lens 13 on which the optical image of the object is made incident, a shutter 14 provided with a diaphragm function for controlling an amount of exposure, and a CCD (image pickup element) 15 for accumulating electric charges of the optical image which has passed through the image pickup lens 13 so as to convert the optical image to an electrical signal.

Moreover, the above-mentioned image processing block 10 includes an A/D converter 16 for converting an analog electrical signal outputted from the CCD 15 to a digital electrical signal, a memory control circuit 17 for controlling the entirety of the image processing block 10, an image display memory 18 into which data for image display is written through the memory control circuit 17, a main memory 19 in which a picked-up still image or moving image is stored, a compressing/expanding circuit 20 for performing compressing/expanding processes on the image data stored in the main memory 19 according to the adaptive discrete cosine transform (ADCT) or the like, an image processing circuit 21 for performing a predetermined pixel interpolation process, a color conversion process and other predetermined arithmetic processes for the image data from the A/D converter 16 or the memory control circuit 17, a D/A converter 22 for converting an output signal (digital electrical signal) from the memory control circuit 17 into an analog electrical signal, a timing generation circuit 23 for supplying a clock signal or a control signal to the CCD 15, the A/D converter 16 and the D/A converter 22 under the control of the memory control circuit 17, an image display part 24 composed of a TFTLCD (thin-film transistor liquid crystal display) or the like for displaying image display data written into the image display memory 18, and I/F parts 25 and 26 for managing an interface operation relative to the I/F parts 3 and 4 connected to the first and second recording parts 5 and 6. Accordingly, the image display part 24 is able to function as an electronic viewfinder when sequentially displaying the picked-up image data. Further, the image display part 24 is able to turn on or off a display optionally according to an instruction from a system control circuit 27 that is to be described later, and if the display is turned off, it becomes possible to considerably reduce the consumption of electric power of the image processing part 1.

Furthermore, the main memory 19 has a storage capacity sufficient for storing a predetermined number of still images or a moving image having a predetermined period of time. Accordingly, even in the case of a continuous shooting for continuously picking up a plurality of still images or in the case of a panoramic shooting, it is possible to perform a fast and high-volume image writing into the main memory 19, and further, it is possible to use the main memory 19 as a work area of the system control circuit 27 that is to be described later.

Moreover, although it is not shown, an optical viewfinder is provided at a suitable location in the above-mentioned image processing block 10, and the optical viewfinder is able to display, for example, an in-focus indication, an indication of the completion of preparation of a photo-taking operation, a camera-shake warning, the charging of a flash device in process, the completion of charging of the flash device, a shutter-speed, an aperture value, an exposure compensation value, a recording medium writing operation, etc.

In the system control block 11, a number of elements thereof, which will be described below, are connected to the system control circuit 27 which manages a system control of the entirety of the image processing part 1.

An exposure control part 28 controls the shutter 14 on the basis of light measurement information from a light measuring control part that is to be described later, and includes a light adjusting function of the flash device. A distance measuring control part 29 performs an AF (automatic focusing) process for automatically measuring a focusing state of picked-up image data obtained from light passing through the image pickup lens 13. Then, the exposure control part 28 and the distance measuring control part 29 are controlled according to a TTL (through the lens) method, and the picked-up image data is subjected to the computing operation of the image processing circuit 21 so as to be used for controlling the exposure control part 28 and the distance measuring control part 29.

A zoom control part 30 controls a zooming action of the image pickup lens 13, a barrier control part 31 controls an operation of the barrier 12, and further, a flash device 32 has a function of projecting AF auxiliary light and a function of adjusting flash light.

A power supply control part 33 is composed of a battery detection circuit, a DC-DC converter, a switching circuit for performing a switching operation among the respective elements which are to be energized, etc., performs the detection of attachment/detachment of a battery as the power supply part 2, the kind of battery and a remaining quantity (level) of the battery, controls the DC-DC converter on the basis of the detection result and an instruction of the system control circuit 27, and supplies the required voltages, for the required periods of time, to the respective parts including the first and second recording parts 5 and 6.

A system memory 34 stores therein constants, variables, programs etc., to be used for the operation of the system control circuit 27.

A display part 35 is composed of a liquid crystal display device (LCD), a light-emitting diode (LED), a lamp, a speaker, etc., and, according to the execution of a program in the system control circuit 27, displays an operation state, a message, a good/bad image quality of picked-up image data, etc., using a character, an image, a voice, etc. Further, the display part 35 is provided in at least one location where a visual recognition is easily made, in the vicinity of an operation part that is to be described later.

In the display part 35, on the LCD, there are displayed, for example, a single shooting/continuous shooting, a self-timer, a compression ratio, the number of recording pixels, the number of recorded images, the number of remaining shootable images, a shutter speed, an aperture value, an exposure compensation value, a red-eye prevention indication, a macro photo-taking indication, a buzzer setting, a battery remaining quantity for use in a clock, a battery remaining quantity, an error message, information indicated by numerals of multiple digits, an attaching state indication of the first and second recording parts 5 and 6, an operation of a communication circuit that is to be described later, a date/time indication, a connection state to an external computer, etc.

Further, in the display part 35, on the LED, there are displayed, for example, besides the in-focus indication and the indication of the completion of preparation of a photo-taking operation, a camera-shake warning, the charging of the flash device in process, the completion of charging of the flash device, a shutter speed, an aperture value, an exposure compensation value, a recording medium writing operation, etc., as is approximately similar to the optical viewfinder.

Moreover, in the display contents of the display part 35, on the lamp, there are displayed, for example, a self-timer notification lamp, etc. The self-timer notification lamp may be also used as the AF auxiliary light.

A non-volatile memory 36 is an electrically erasable/recordable memory, for example, an EEPROM.

A communication circuit 37 includes a variety of communication functions such as the RS232C, the IEEE1394, the P1284, the SCSI, a modem, a LAN, a radio communication, etc.

A connector 38 connects the image processing part 1 to other external apparatuses through the communication circuit 37. Further, in a case where the communication circuit 37 has a radio communication function, an antenna is connected to the communication circuit 37, in place of the connector 38.

A recording medium attaching/detaching detection sensor 39 detects whether the connectors 52 and 54 are connected to the connectors 51 and 53 or not.

Further, a group of operation units such as a mode dial 40, first and second shutter switches 41 and 42, an image display switch 43, a quick review switch 44, an operation part 45, etc., are connected to the system control circuit 27, so as to enable a variety of operation instructions to be inputted to the system control circuit 27.

The mode dial 40 includes a control photo-taking mode switch and an image photo-taking mode switch. Here, the control photo-taking mode switch is used to select one of an automatic photo-taking mode, a program photo-taking mode, a shutter-speed-priority photo-taking mode, an aperture-priority photo-taking mode, a manual photo-taking mode, a focus-depth-priority photo-taking mode and a panoramic photo-taking mode. The image photo-taking mode switch is used to select one of a portrait photo-taking mode, a landscape photo-taking mode, a close-up photo-taking mode, a sport photo-taking mode and a night-scene photo-taking mode.

The first shutter switch (SW1) 41 turns on when a shutter release button (not shown) is in a half-depressed state (in a first stroke), so as to give instructions for starting operations of an AF (automatic focusing) process, an AE (automatic exposure) process, an AWB (automatic white balance) process, an EF (flash light adjustment) process, etc.

The second shutter switch (SW2) turns on when an operation of the shutter release button (not shown) is completed (in a second stroke), so as to give instructions for starting operations of a series of processes such as a writing process for writing image data from the CCD 15 into the main memory 19, a development process based on an arithmetic operation (calculation) of the image processing circuit 21 or the memory control circuit 17, and a recording process for reading the image data from the main memory 19, performing a compressing operation of the image data with the compressing/expanding circuit 20 and writing the image data into the first or second recording part 5 or 6, etc.

The image display switch 43 is arranged to set an on-state or off-state of the image display part 24, so that it is possible to cut off a power source supply to the image display part 24 at the time of performing a photo-taking operation using the optical viewfinder (not shown), thereby attaining saving of electric power.

The quick review switch 44 is used for such setting as to automatically reproduce picked-up image data immediately after the photo-taking operation. In the present embodiment, such setting is made that the above automatic reproduction is performed when the image display part 24 is brought into an off-state.

The operation part 45 includes a variety of buttons and touch panels, i.e., a menu button, a set button, a macro button, a multi screen reproducing/page breaking button, a flash setting button, a single shooting/continuous shooting/self-time switching button, a menu shift plus (+) button, a menu shift minus (−) button, a reproduced image shift plus (+) button, a reproduced image shift minus (−) button, a photo-taking image quality selection button, an exposure compensation button, a date/time setting button, etc. Moreover, the respective functions of the above-mentioned plus buttons and minus buttons are attained by providing a rotary dial switch, so that numerical values and functions can be selected more lightly.

In the following, a control method of the image processing apparatus according to the embodiment of the invention will be described.

Figure 2:
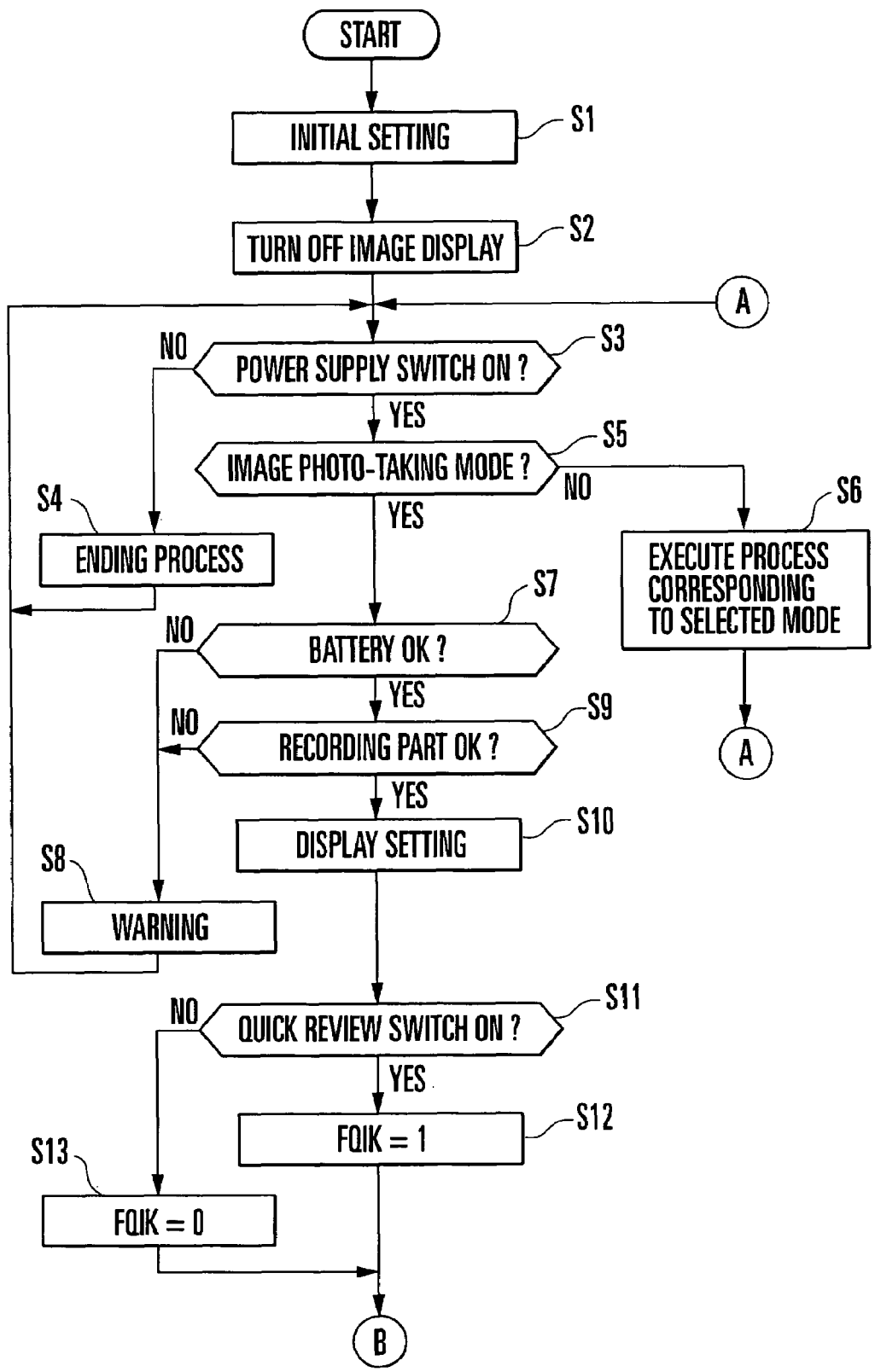
FIG. 2 is a flow chart showing the control procedures of the control method for the image processing apparatus shown in FIG. 1.
Figure 3:
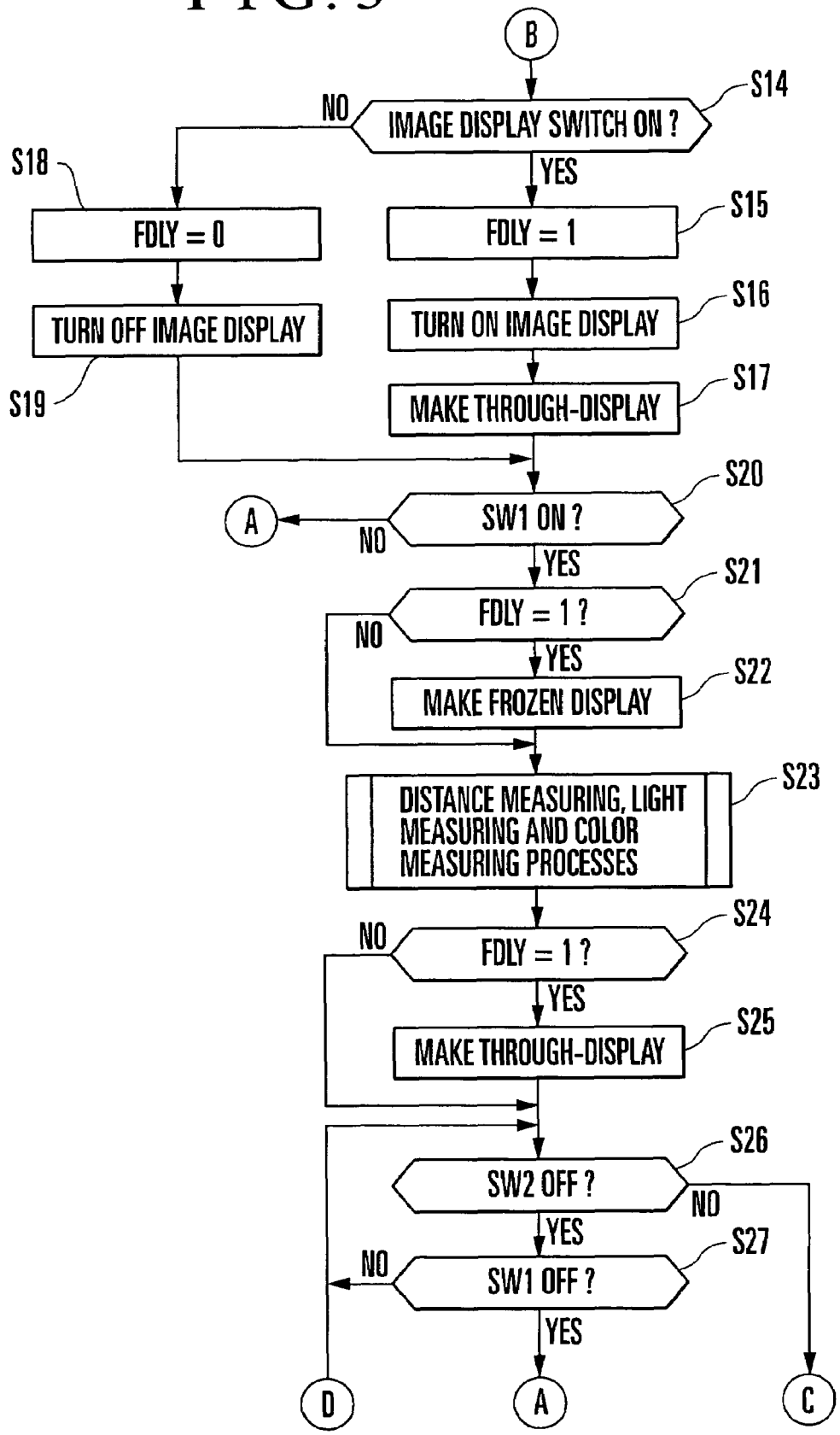
FIG. 3 is a flow chart showing the control procedures of the control method for the image processing apparatus shown in FIG. 1.
Figure 4:
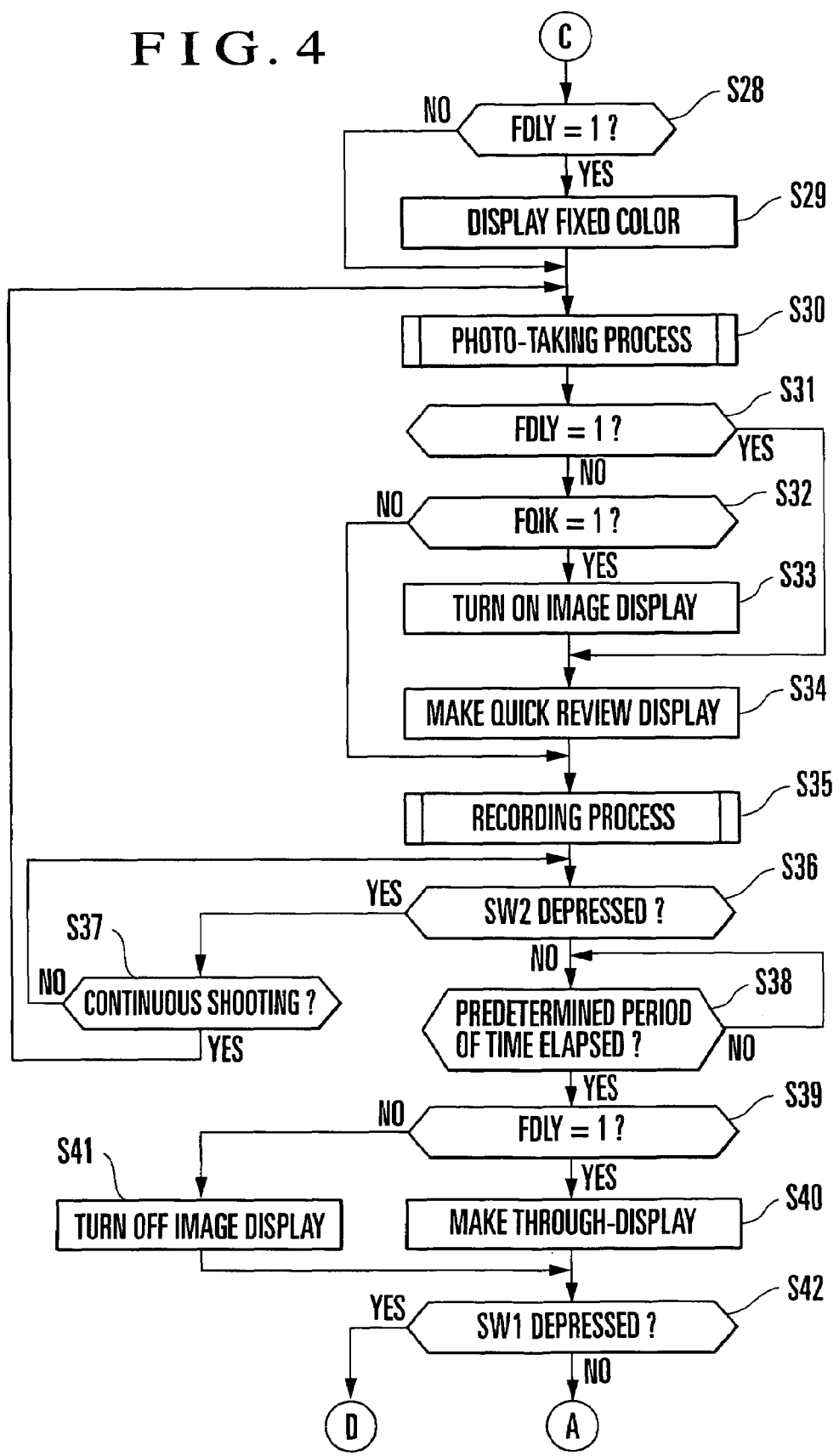
FIG. 4 is a flow chart showing the control procedures of the control method for the image processing apparatus shown in FIG. 1.

FIGS. 2 to 4 are flow charts showing the control procedures in the control method for the image processing apparatus according to the embodiment of the invention. The present program is executed in the system control circuit 27.

In FIG. 2, first, in step S1, a quick review flag FQIK, an image display flag FDLY and a variety of control variables are initialized, and in the next step S2, the image display part 24 is set to an off-state.

Then, in step S3, it is determined whether the power supply switch (not shown) is turned on or not, on the basis of a location of the mode dial 40. If the result of the determination in step S3 is "No", a predetermined ending process (step S4) is performed, and the flow returns to step S3. That is, the predetermined ending process is performed in such a manner that the displays in the respective display parts are changed to the ending states, the barrier 12 is closed to protect the image pickup system block 9, the quick review flag FQIK, the image display flag FDLY, the required parameters including the control variables, the set values and the setting modes are written into the non-volatile memory 36, and, further, the unnecessary power supplies in the respective constituent members in the image processing part 1 including the image display part 24 are cut off by the power supply control part 33. Then, the flow returns to step S3.

On the other hand, if it is determined in step S3 that the power supply switch is turned on, the flow proceeds to step S5, where it is determined whether the mode dial 40 is set to the image photo-taking mode or not. If the result of the determination in step S5 is "No", i.e., when the mode dial 40 is set to the control photo-taking mode such as the automatic photo-taking mod, the program photo-taking mode, the shutter-speed-priority photo-taking mode, etc., the flow proceeds to step S6, where a predetermined process corresponding to the control photo-taking mode as being set is performed. Then, the flow returns to step S3.

Further, it is determined in step S5 that the mode dial 40 is set to the image photo-taking mode such as the portrait photo-taking mode, the sport photo-taking mode, the night scene photo-taking mode, etc., the flow proceeds to step S7, where it is determined by the power supply control part 33 whether there is a sufficient remaining quantity of the battery which constitutes the power supply part 2 or not. If the result of the determination in step S7 is "No", a predetermined warning display using an image or a voice is made in the display part 35 (step S8), and the flow returns to step S3.

Moreover, if the result of the determination in step S7 is "Yes", it is determined in step S9 whether the first and/or second recording part 5 or 6 is attached to the image processing part 1 or not. If the first and/or second recording part 5 or 6 is attached to the image processing part 1, management information of the image data recorded in the first and/or second recording part 5 or 6 is obtained, and it is determined whether an operation state thereof has a problem in an operation of the image processing part 1, more particularly, in a recording/reproducing operation of the image data for the first and/or second recording part 5 or 6.

Then, if the result of the determination is "No", the flow proceeds to step S8, a predetermined warning display using an image and/or a voice is made at the display part 35. Then, the flow returns to step S3. If the result of the determination in step S9 is "Yes", the flow proceeds to step S10.

Then, in step S10, the respective setting states of the image processing part 1 are displayed using an image and/or a voice at the display part 35. Further, when the image display of the image display part 24 is in an on-state, the display of the respective setting states of the image processing part 1 is also performed using an image and/or a voice at the image display part 24.

Then, in step S11, it is determined whether the quick review switch 44 is turned on or not. If the result of the determination in step S11 is "Yes", the quick review flag FQIK is set to "1" (step S12). If the result of the determination in step S11 is "No", the quick review flag FQIK is set to "0" (step S13). Then, the flow proceeds to step S14 in FIG. 3. Incidentally, a setting state of the quick review flag FQIK is stored either in an internal memory of the system control circuit 27 or the system memory 34.

Next, in step S14 (FIG. 3), it is determined whether the image display switch 43 is in an on-state or not. If the result of the determination in step S14 is "Yes", the image display flag FDLY is set to "1" (step S15), and, after the image display part 24 is brought into an on-state (step S16), the image display part 24 is set to a through-display state so as to sequentially display picked-up image data (step S17). Then, the flow proceeds to step S20. In this through-display state, an electronic viewfinder function is implemented by sequentially displaying the data which has been sequentially written in the image display memory 18 through the CCD 15, the A/D converter 16, the image processing circuit 21 and the memory control circuit 17, on the image display part 24 through the memory control circuit 17 and the D/A converter 22.

Further, if the result of the determination in step S14 is "No", the flow proceeds to step S18, where the image display flag FDLY is set to "0". Then, in step S19, the image display part 24 is set to an off-state, and the flow proceeds to step S20. When the image display part 24 is in the off-state, a photo-taking operation is performed by using an optical viewfinder (not shown), without using the electronic viewfinder function. Then, as a result thereof, it is possible to reduce the consumption of electric power of the image display part 24, the D/A converter 22, etc., which have large quantities of electric power consumption. Incidentally, a setting state of the image display flag FDLY is stored either in an internal memory of the system control circuit 27 or the system memory 34.

Then, in step S20, it is determined whether the first shutter switch (SW1) 41 is depressed or not. If the first shutter switch (SW1) is not depressed, the flow returns to step S3 in FIG. 2. If the first shutter switch (SW1) 41 is depressed, it is determined in step S21 whether the image display flag FDLY is set to "1" or not. If the result of the determination in step S21 is "No", the flow immediately proceeds to step S23. If the result of the determination in step S21 is "Yes", the image display part 24 is set to a frozen display state (step S22), and the flow proceeds to step S23. In this frozen display state, a rewriting operation of the image data in the image display memory 18 through the CCD 15, the A/D converter 16, the image processing circuit 21 and the memory control circuit 17 is inhibited, and image data which has been written at the last time is displayed on the image display part 24 through the memory control circuit 17 and the D/A converter 22, so that a frozen video image is displayed on the electronic viewfinder.

Then, in step S23, the distance measuring, light measuring and color measuring processes are performed. That is, a focus of the image pickup lens 13 is adjusted onto an object by performing the distance measuring process, an aperture value and a shutter time are determined by performing the light measuring process, and a white balance is adjusted by performing the color measuring process. Further, in the light measuring process, the setting of the flash device 32 is made as required. Then, evaluation values obtained from the distance measuring, light measuring and color measuring processes and the setting of the flash device 32 are stored in the internal memory of the system control circuit 27 or the system memory 34.

Then, in step S24, it is determined whether the image display flag FDLY is set to "1" or not. If the result of the determination in step S24 is "No", the flow immediately proceeds to step S26. If the result of the determination in step S24 is "Yes", the image display part 24 is set to the through-display state (step S25), in the same manner as in step S17. Then, the flow proceeds to step S26.

In step S26, it is determined whether the second shutter switch (SW2) 42 is depressed or not. If the second shutter switch (SW2) 42 is not depressed, i.e., when the second shutter switch (SW2) 42 is in an off-state, it is determined in step S27 whether the first shutter switch (SW1) 41 is in the off-state or not. If the first shutter switch (SW1) 41 is in the on-state, the flow returns to step S26. If the first shutter switch (SW1) 41 is in the off-state, the flow returns to step S3 in FIG. 2.

On the other hand, in step S26, when the second shutter switch (SW2) 42 is depressed, the flow proceeds to step S28 in FIG. 4, where it is determined whether the image display flag FDLY is set to "1" or not. If the result of the determination in step S28 is "No", the flow immediately proceeds to step S30. If the result of the determination in step S28 is "Yes", the display state of the image display part 24 is set to a fixed color display state (step S29), and the flow proceeds to step S30. In this fixed color display state, in place of the picked-up image data which has been written into the image display memory 18 through the CCD 15, the A/D converter 16, the image processing circuit 21 and the memory control circuit 17, image data of the fixed color is displayed by the image display part 24 through the memory control circuit 17 and the D/A converter 22, so that a video image of the fixed color is displayed on the electronic viewfinder.

Then, in step S30, a photo-taking process is performed. In the photo-taking process, the various kinds of processes are performed by writing, into the main memory 19, the picked-up image data obtained from the CCD 15 through the A/D converter 16, the image processing circuit 21 and the memory control circuit 17 or directly through the A/D converter 16 and the memory control circuit 17, and by reading the image data written in the main memory 19 using the memory control circuit 17, or also using the image processing circuit 21 as required.

Then, in step S31, it is determined whether the image display flag FDLY is set to "1" or not. If the result of the determination in step S31 is "Yes", the flow immediately proceeds to step S34, where the quick review display is made. After that, the flow proceeds to step S35. In addition, in this case, the image display part 24 is always in the state of making a display as the electronic viewfinder during the photo-taking process, the quick review display, which is to be made immediately after the photo-taking process, is also made.

On the other hand, if the result of the determination in step S31 is "No", the flow proceeds to step S32, where it is determined whether the quick review flag FQIK is set to "1" or not. If the result of the determination in step S32 is "No", the flow proceeds to step S35. If the result of the determination in step S32 is "Yes", the image display part 24 is set to the on-state (step S33), and, then, the quick review display (step S34) is made. Then, the flow proceeds to step S35. That is, when both of the image display flag FDLY and the quick review flag FQIK are set to "0", the image display part 24 is kept in the off-state, and the flow proceeds to step S35. Then, in this case, even after the photo-taking process is performed, the image display part 24 is kept in the off-state, and no quick review display is performed. This is because, as in a case where a photo-taking process is continued using the optical viewfinder, the confirmation of a picked-up image to be performed immediately after the photo-taking process is not necessary, and the saving of electric power is emphasized without using the electronic viewfinder function of the image display part 24.

Then, in step S35, a recording process is performed. In the recording process, the picked-up image data written in the main memory 19 is read out, and the various kinds of image processes are performed using the memory control circuit 17 and the image processing circuit 21 as required. Also, after having performed the image compressing process corresponding to the setting mode using the compressing/expanding circuit 20, the image data is written into the first or second recording part 5 or 6. In the recording process, an evaluation value of the picked-up image data is compared with an evaluation value obtained before the photo-taking process is performed, and a warning is issued if a difference between the two evaluation vales is equal to or more than a predetermined evaluation reference value which is set according to the photo-taking condition. Thus, the photographer is required to decide whether to record the image data or not, and the image data is automatically recorded if there is no input from the photographer even after a predetermined period of time has elapsed during this decision.

Then, in step S36, it is determined whether the second shutter switch (SW2) 42 is depressed or not. If the result of the determination in step S36 is "Yes", the flow proceeds to step S37, where it is determined whether a continuous photo-taking operation (continuous shooting) is to be performed or not. If the result of the determination in step S37 is "Yes", the flow returns to step S30, so that the above-described processes beginning with the photo-taking process is repeated. On the other hand, if the result of the determination in step S37 is "No", the flow returns to step S36, waiting for the second shutter switch (SW2) 42 to be released from the depression. Then, if the result of the determination in step S36 is "No", i.e., if the second shutter switch (SW2) 42 is not depressed, it is determined whether a predetermined period of time has elapsed or not (step S38). If the result of the determination in step S38 is "No", the flow waits for the predetermined period of time to elapse. If the predetermined period of time has elapsed, the flow proceeds to step S39, where it is determined whether the image display flag FDLY is set to "1" or not. If the result of the determination in step S39 is "Yes", the display state of the image display part 24 is set to a through-display state (step S40), and the flow proceeds to step S42. Further, in this case, after the picked-up image is confirmed by the photographer on the basis of the quick review display on the image display part 24, picked-up image data is sequentially displayed for the next photo-taking operation.

If the result of the determination in step S39 is "No", the image display part 24 is set to an off-state (step S41), and the flow proceeds to step S42. As a result, after the picked-up image is confirmed on the basis of the quick review display on the image display part 24, the function of the image display part 24 can be stopped for saving electric power, so that it is possible to reduce the consumption of electric power of the image display part 24, the D/A converter 22, etc., which have large quantities of electric power consumption.

Then, in step S42, it is determined whether the first shutter switch (SW1) 41 is depressed or not. If the first shutter switch 41 is in a depressed state, the flow returns to step S26 in FIG. 3 for the purpose of making preparation for the next photo-taking operation. If the first shunter switch 41 is not depressed, the flow returns to step S3 in FIG. 2.

Figure 5:
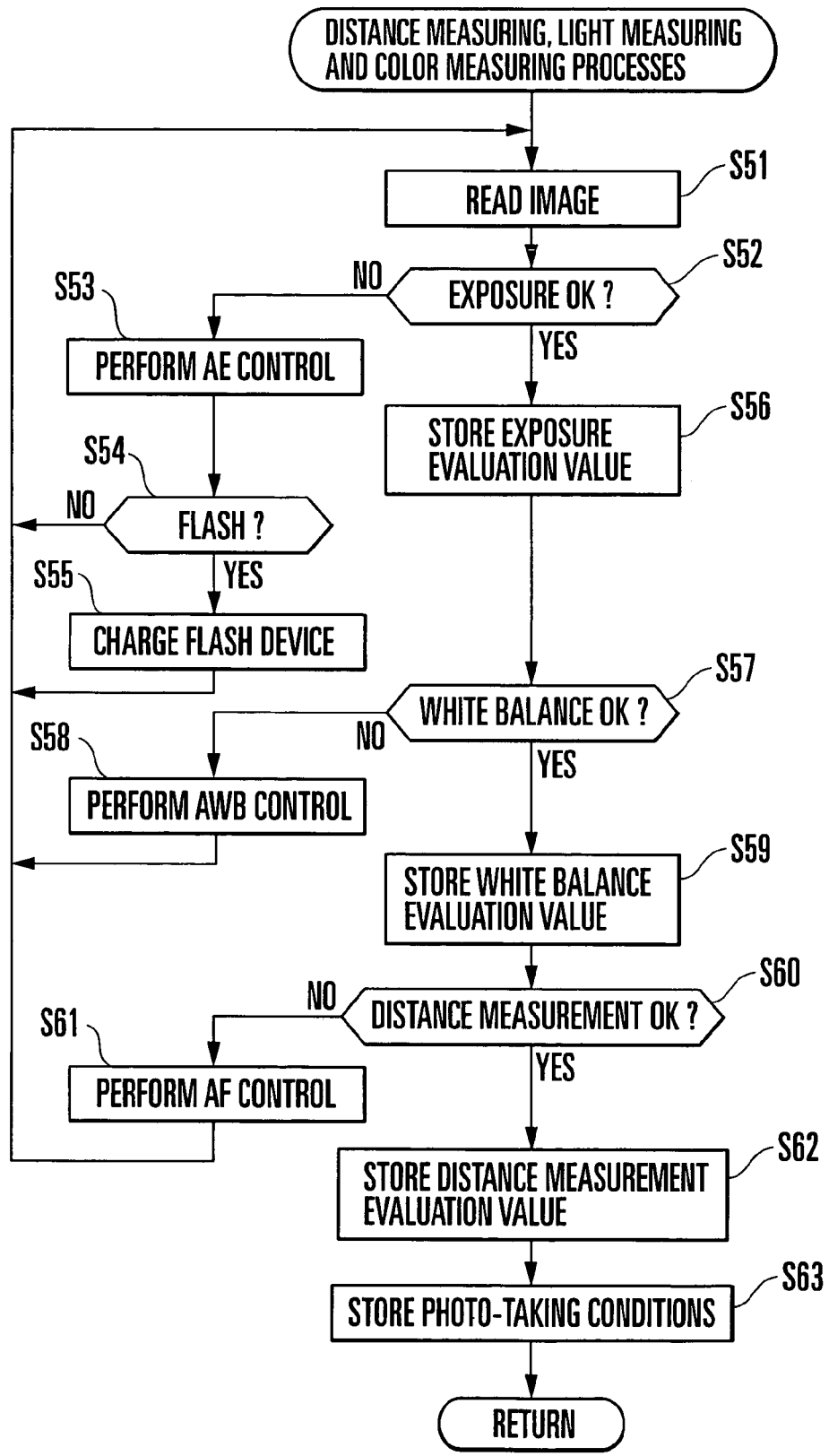
FIG. 5 is a flow chart of the routine for the distance measuring, light measuring and color measuring processes shown in FIG. 3.

FIG. 5 is a flow chart of the routine for the distance measuring, light measuring and color measuring processes which are performed in step S23 in FIG. 3.

First, in step S51, an electric charge signal is read out from the CCD 15, so that the picked-up image data is sequentially read into the image processing circuit 21 through the A/D converter 16. The image processing circuit 21 uses the above-mentioned sequentially-read image data to execute the arithmetic operation for performing the AE process, EF (flash preliminary light emission) process, AWB process, and AF process according to the TTL method.

Further, in the above processes, specific parts of picked-up image data of all the pixels are cut out and extracted as required, and are used for the above arithmetic operation. As a result, in the respective processes of the AE, EF, AWB and AF according to the TTL method, it becomes possible to perform the most appropriate arithmetic operation for each of different modes such as a center-weighed mode, an average mode and an evaluation mode. In the AE control process, the electrical charge signal from the CCD 15 is converted into a digital value by the A/D converter 16, an image plane is divided into predetermined areas by the image processing circuit 21, and an integral value of image data in each of the predetermined areas is found to obtain a light measurement evaluation value. The light measurement evaluation values of the respective areas are weighted, and in consideration with the weight, a light measurement evaluation value for the whole image plane is obtained.

In step S52, it is determined whether an exposure is appropriate or not. If the result of the determination in step S52 is "No", the flow proceeds to step S53, where the AE control process is performed by the exposure control part 28. Then, in step S54, it is determined whether the flash device 32 is required to be used or not. If the result of the determination in step S54 is "No", the flow returns to step S51. If the result of the determination in step S54 is "Yes", the flow proceeds to step S55, where the flash device 32 is charged, and the flow returns to step S51.

In the manner as described above, the steps S53 to S55 are repeated until an appropriate exposure is obtained, and the flow proceeds to step S56 when the appropriate exposure is obtained. In step S56, the measurement data, the setting parameters and the light measurement evaluation value are stored in the internal memory of the system control circuit 27 or the system memory 34.

Then, in step S57, it is determined whether a white balance is appropriate or not. If the result of the determination in step S57 is "No", the AWB control process is performed (step S58). Here, in the AWB control process, an electrical charge signal from the CCD 15 is converted into a digital value by the A/D converter 16, an image plane is divided into predetermined areas by the image processing circuit 21, and an integral output of the color-difference signals R-Y and B-Y for each of the respective areas is obtained as a color measurement evaluation value. That is, an area whose color measurement evaluation value is equal to or less than a predetermined value is selected, from the areas, as a white balance adjustment area, and the gains of the respective color signals are adjusted in such a manner that the color measurement evaluation value of this area becomes near to zero, so that a point at which the white balance becomes appropriate is detected.

In the manner as described above, the AWB control process is performed until the appropriate white balance is obtained. When it is determined that the appropriate white balance is obtained, the result of the determination in step S57 becomes "Yes", and the flow proceeds to step S59, where the measurement data, the setting parameters, the color measurement evaluation value and the white balance adjustment area are stored in the internal memory of the system control circuit 27 or the system memory 34.

Then, in step S60, it is determined whether an appropriate focusing (distance measuring) operation has been performed or not. If the result of the determination in step S60 is "No", the flow proceeds to step S61, where the AF control process is performed. In the AF control process, a high-frequency component of the electrical charge signal from the CCD 15 is taken out, and the high-frequency component is converted into a digital value by the A/D converter 16. Then, a predetermined part of the digital signal in an image plane is extracted, and an integral value of the predetermined part is determined as a distance measurement evaluation value for the current field. Then, the image pickup lens 13 is driven through the distance measuring control part 29, so that distance measurement evaluation values from the nearest distance to the infinity distance are obtained. When the appropriate focusing operation has been performed, the result of the determination in step S60 becomes "Yes", and, in step S62, the distance measurement evaluation values are stored in the internal memory of the system control circuit 27 or the system memory 34. In the next step S63, photo-taking conditions including the photo-taking mode as presently being set and the setting of the flash device 32, for example, a slow-shutter mode, the amount of exposure compensation, the amount of light emission of the flash device 34, etc., are stored in the internal memory of the system control circuit 27 or the system memory 34, and the flow returns to the main routine in FIG. 3. Then, an in-focus position is computed by using the distance measurement evaluation values obtained in the above-described manner and the measurement data obtained in the AE control process and the AWB control process.

Figure 6:
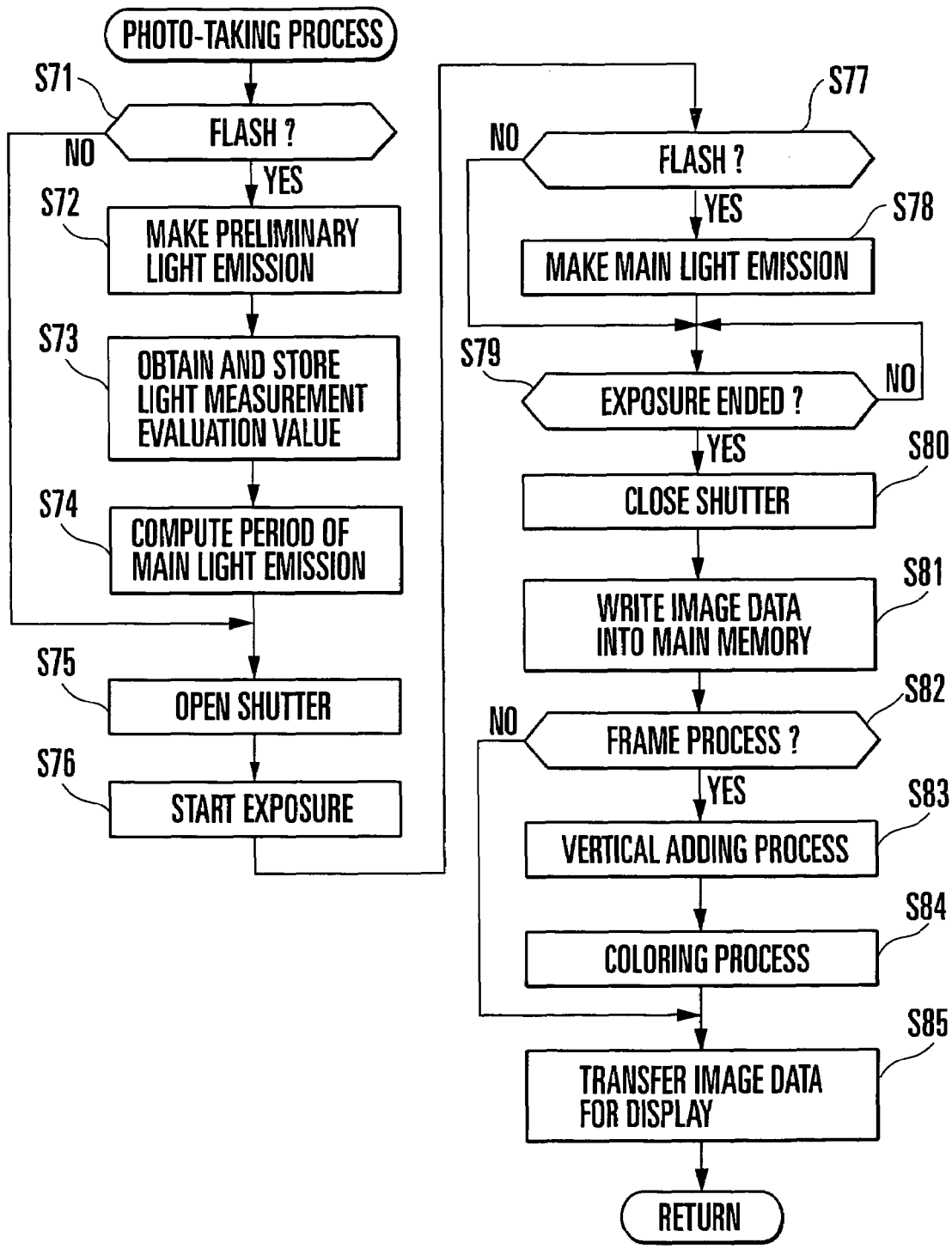
FIG. 6 is a flow chart of the routine for the photo-taking process.

FIG. 6 is a flow chart of the routine for the photo-taking process which is performed in step S30 in FIG. 4.

In step S71, it is determined whether the flash device 32 is required or not. If the result of the determination in step S71 is "No", the flow immediately proceeds to step S75. If the result of the determination in step S71 is "Yes", the flash device 32 is caused to make preliminary light emission (step S72). Then, an electrical charge signal from the CCD 15 is read out, so that the picked-up image data is written into the image processing circuit 21 through the A/D converter 16. Then, a light measurement value is obtained from the picked-up image data, and a light measurement evaluation value is stored (step S73). Next, a period of the main light emission of the flash device 32 is computed on the basis of the light measurement value (step S74), and the flow proceeds to step S75.

Then, in step S75, the exposure control part 28 is driven on the basis of the light measurement data stored in the internal memory of the system control circuit 27 or the system memory 34, and the shutter 14 is opened in accordance with the aperture value (step S75), so that an exposure is started (step S76).

Then, in step S77, it is determined whether the flash device 32 is required or not. If the result of the determination in step S77 is "No", the flow immediately proceeds to step S79. If the result of the determination in step S77 is "Yes", the flash device 32 is caused to make the main light emission (step S78). Then, the flow proceeds to step S79.

In step S79, the flow waits for the completion of an exposure of the CCD 15 in accordance with the light measurement data. After the exposure has been completed, the flow proceeds to step S80, where the shutter 14 is closed. Then, the picked-up image data is written into the main memory 19 (step S81). That is, the electrical charge signal is read out from the CCD 15, and the picked-up image data is written into the main memory 19 through the A/D converter 16, the image processing circuit 21 and the memory control circuit 17, or directly through the A/D converter 16 and the memory control circuit 17.

In the subsequent step S82, it is determined whether a frame process corresponding to the set photo-taking mode is to be performed or not. If the result of the determination in step S82 is "No", the flow immediately proceeds to step S85. If the result of the determination in step S82 is "Yes", the image data written in the main memory 19 is read out using the memory control circuit 17 and the image processing circuit 21 as required. Then, the image data is sequentially subjected to a vertical addition process (step S83) and a coloring process (step S84). After that, the processed picked-up image data is written into the main memory 19 again.

Then, in the next step S85, the picked-up image data is read out from the main memory 19, and image data for display is transferred to the image display memory 18 through the main control circuit 17. Then, the flow returns to the main routine in FIG. 4.

Figure 7:
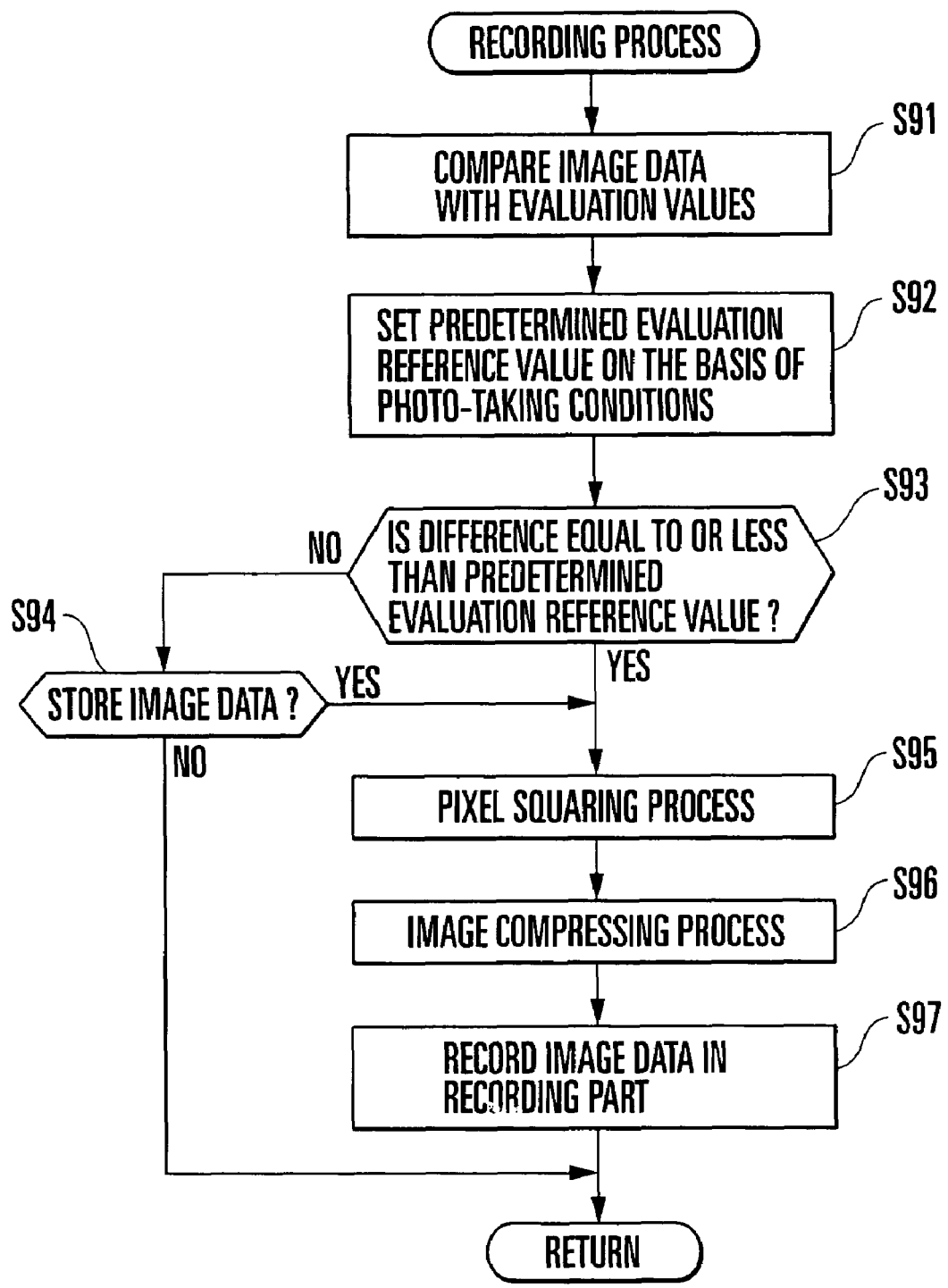
FIG. 7 is a flow chart of the routine for the recording process.

FIG. 7 is a flow chart of the routine for the recording process which is performed in step S35 in FIG. 4.

First, in step S91, the picked-up image data written in the main memory 19 is read out, and the exposure evaluation value, the white balance evaluation value and the distance measurement evaluation value which have been stored in the internal memory of the system control circuit 27 or the system memory 34 in the stage before the photo-taking operation in steps S56, S59 and S62 in FIG. 5 are respectively compared with the exposure evaluation value, the white balance evaluation value and the distance measurement evaluation value of the picked-up image data. Then, in step S92, a predetermined evaluation reference value is set in accordance with the photo-taking conditions stored in step S63 in FIG. 5. Then, it is determined whether the difference value (absolute value deviation) between the picked-up image data and the respective evaluation values obtained before the photo-taking operation are equal to or less than the predetermined evaluation reference value or not (step S93). If the result of the determination in step S93 is "Yes", the flow proceeds to step S95.

On the other hand, if the result of the determination in step S93 is "No", i.e., if the difference value exceeds the predetermined evaluation reference value, the flow proceeds to step S94. In step S94, the LED (display lamp) of the display part 35 is turned on with a predetermined color, or a warning is issued to the photographer through a voice, so as to determine whether to store the picked-up image data or not. If the result of the determination in step S94 is "No", the process is ended as it is, and the flow returns to the main routine (FIG. 4). If the result of the determination in step S94 is "Yes", or if there is no instruction from the photographer until a predetermined period of time has elapsed, the flow proceeds to step S95.

Then, in step S95, a pixel squaring process for compensating a vertical and horizontal pixel ratio of the image pickup element in the picked-up image data into 1:1 is performed, and the thus-processed picked-up image data is stored in the main memory 19. In the subsequent step S96, the image data written in the main memory 19 is read out, and an image compressing process corresponding to the mode as being set is performed on the image data by the compressing/expanding circuit 20. In step S97, the compressed image data is written into the first or second recording parts 5 or 6 through the I/F parts 25, 26, 3 and 4 and the connectors 51 to 54, and the flow returns to the main routine (FIG. 4).

According to the present embodiment described above, the respective evaluation values of the light measuring, color measuring and distance measuring processes obtained in a pre-photo-taking operation are stored (steps S56, S59 and S62), and, then, are compared with respective evaluation values of picked-up image data obtained in a photo-taking operation (step S91). Therefore, even when an image different from the aimed image is picked up as the images have changed at a point of time between the pre-photo-taking operation and the photo-taking operation, the photographer is enabled to know such a fact.

That is, when the brightness of the object image is changed as an illumination power etc., of the light source are changed, the difference between the integral value of the picked-up image data and the light measurement evaluation value becomes larger, so that it is possible to detect that an exposure has deviated from an appropriate value. Also, when a light source is changed, for example, when the light source is changed from a fluorescent lamp to an incandescent lamp, a white balance deviates from an appropriate value, so that a color-tone of the picked-up image data also changes. In this instance, since a difference between the color measurement evaluation value and an integral value of each of the color-difference signals R-Y and B-Y of the white color parts of the picked-up image data becomes away from "0", it is possible to easily detect that the white balance has deviated from the appropriate value.

Further, when an object moves, or when the hand of a photographer holding the apparatus vibrates, an integral value of a high-frequency component of the picked-up image data decreases, so that a difference occurs between the integral value and the distance measurement evaluation value obtained before the photo-taking operation. Therefore, it is possible to easily detect that image data whose image quality has remarkably lowered due to the vibration of the hand, the vibration of the object or the movement of the object has been picked up.

Accordingly, when picked-up image data of good quality has not been able to be obtained as the exposure or the white balance has changed or when the object has moved or the hand of the photographer has vibrated, the photographer can easily know such a state, and, by stopping recording the picked-up image data in the recording part 5 or 6 or by performing a photo-taking operation again as required, can obtain a desired picked-up image data.

Further, in a case where the photo-taking mode is a specific mode such as a slow-shutter mode, there is a possibility that the shaking of an object image is caused intentionally. Therefore, in this case, a predetermined evaluation reference value is made different from the ordinary value according to the photo-taking conditions, so that it is possible to greatly prevent an unnecessary warning from being issued. Similarly, also in a case where a flash device is made to make light emission or where an exposure compensation is performed, a predetermined evaluation reference value is made different from the ordinary value according to the photo-taking conditions, so that it is possible to greatly prevent an unnecessary warning from being issued.

Further, in the present embodiment, when the difference between the picked-up image data and the evaluation value has exceeded the predetermined evaluation reference value, the photographer is asked to make selection as to whether to record the picked-up image data, and the picked-up image data is automatically recorded if a predetermined waiting period of time has elapsed without the selection. In this instance, this waiting period of time may be a fixed value, or may be selected optionally within a predetermined range by the photographer. Furthermore, a recording operation may be prohibited forcibly when the difference has exceeded the predetermined evaluation reference value.

Further, in the above-mentioned embodiment, when the image display part 24 is turned off, all of the elements which constitute the image display part 24 are turned off. However, in this instance, a part of the elements of the image display part 24 may be arranged to be turned off. In this case too, the confirmation of picked-up image data and the saving of electric power can be performed. For example, in a case where the image display part 24 is composed of an LCD and a back-light, while the LCD remains in the on-state, the back-light alone is turned off. In this case also, it is possible to attain an image processing apparatus having the function of performing the confirmation of picked-up image data and the saving of electric power, in the same manner as in the above-mentioned embodiment.

Further, in the above-mentioned embodiment, the image display switch 43 and the quick review switch 44 are separately provided. However, the image display switch 43 and the quick review switch 44 may be combined into one switch. Moreover, when an instruction for ending the quick review display on the image display part 24 is given, there is provided a predetermined period of time for continuing the quick review display. However, such an arrange may be adopted that there is not provided the predetermined period of time. In this case, it is necessary to produce a program in which, in FIG. 4, the process of determining the lapse of the predetermined period of time in step S38 is eliminated. Further, image display parts for exclusive use for the through-display and the quick review display, respectively, may be provided, and the turning-on/off of the image display parts may be performed in accordance with the setting of the image display switch 43 and the quick review switch 44. In this case also, it is possible to provide the function of performing the confirmation of picked-up image data and the saving of electric power, in the same manner as in the above-mentioned embodiment.

Moreover, in the present embodiment, when the image display switch 43 is in the on-state, regardless of the setting of the quick review switch 45, the quick review display is performed immediately after the photo-taking operation.

However, whether to perform the quick review display or not may be decided in accordance with the setting of the quick review switch 44 when the image display switch 43 is in the on-state.

Further, each of the first and the second recording parts 5 and 6 may be composed of not only a memory card such as a PC card and a compact flash memory card, a hard-disk, etc., but also a micro-DAT, a magneto-optical disk, an optical disk such as a CD-R and a CD-WR, a phase-change type optical disk such as a DVD, etc.

Further, each of the first and second recording parts 5 and 6 may be composed of a composite medium into which a memory card and a hard-disk or the like are integrated. Moreover, a part of the composite medium may be arranged to be detachable therefrom.

Then, in the above-mentioned embodiment, the first and second recording parts 5 and 6 are arranged to be separated from the image processing part 1 and to be connectable optionally thereto. However, either one or all of the recording parts 5 and 6 may be fixed to the image processing part 1.

Further, the present invention can achieve an aimed object by supplying a recording medium in which a software program for implementing the above-described control method is recorded, to a system or an apparatus, and by reading and performing the program codes stored in the recording medium with a computer in the system or the apparatus. In this case, the program codes themselves which are read out from the recording medium implement the above-described control method, and as a recording medium for storing the program, for example, an arbitrary recording medium can be used such as a flexible disk, a hard-disk, an optical disk, a magneto-optical disk, a CD-ROM, a CD-R, a magnetic tape, a non-volatile memory card, etc.

Furthermore, while the above-described control method is implemented by performing the program codes read by the computer, it goes without saying that the aimed object can be achieved also when an operating system (OS) running on the computer performs a part of or all of the actual processes on the basis of instructions of the program codes.

Moreover, after program codes which are read out from the recording medium are written into an extension board or an extension memory which is attached to a computer, a CPU or the like may perform a part of or all of the processes on the basis of instructions from the program codes.

Further, in the above-mentioned embodiment, the comparisons of the evaluation values and the picked-up image data are performed for all of the light measuring, color measuring and distance measuring processes. However, such comparisons may be performed for one of or a combination of two of the light measuring, color measuring and distance measuring processes. This usage method is effective when the photographer intends to pick up an image with a dark exposure, or when the photographer intends to pick up an image with a different color-tone under a special light source, or when the photographer is satisfied to be able to pick up an image anyway without considering the hand vibration or the object image vibration.

As has been described above in detail, according to the image processing apparatus, the control method for the image processing apparatus, and the recording medium in the embodiment of the present invention, photo-taking environment characteristics (the focal length characteristic, the exposure characteristic and the color characteristic) obtained before and after the photo-taking operation are compared with each other, and the evaluation of the picked-up image data is performed on the basis of the result of the above comparison. Accordingly, by issuing a warning to the photographer when a photo-taking operation has been performed in such a state that an exposure or a white balance is out of order as the light source has changed between before and after the photo-taking operation, and prohibiting the picked-up image data from being stored, a degraded image is no longer recorded in the recording part, and by performing a photo-taking operation again as required, only picked-up image data of good quality can be recorded in the recording part.

Furthermore, similarly, by issuing a warning etc., in accordance with an evaluation by the evaluation means, when a photo-taking operation has been performed in such a state that an object is moving or the hand of the photographer is vibrating, it is also possible to prevent a degraded image from being recorded.

Further, the picked-up image data is evaluated on the basis of the result of comparison by the comparison means and the storage content of the second storage means. In other words, an absolute value deviation between the first photo-taking environment characteristic and the second photo-taking environment characteristic is compared with a predetermined evaluation reference value so as to evaluate the picked-up image data. Therefore, in a case where the shaking of an object image is intentionally made to occur as in the slow-shutter mode, the predetermined evaluation reference value is made different from that for the other photo-taking conditions, so that it is possible to greatly prevent an unnecessary warning from being issued.

The individual components shown in schematic or block form in the drawings are all well-known in the camera arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Further, the software arrangement and the hardware arrangement in the above-mentioned embodiment may be adaptively replaced with each other.

Further, in the invention, the technical elements of the above-mentioned embodiment may be combined with each other according to necessity.

Further, the invention also applies to cases where each claim or the whole or a part of the arrangement of the embodiment constitutes one apparatus or is used in combination with another apparatus or as a component element of an apparatus.

Further, the invention is also applicable to various types of cameras, such as an electronic still camera, a video camera and a camera using a silver-halide film, various image pickup apparatuses other than cameras, various optical apparatuses, such as a lens barrel, and other types of apparatuses, and, moreover, to apparatuses adapted for the cameras, the image pickup apparatuses, optical apparatuses and the other types of apparatuses, a method, a computer program product, such as a storage medium, having the method stored therein, and elements constituting the above-mentioned apparatuses, the method or the computer program product.

The invention claimed is:

1. An image capture apparatus comprising:
   an image capture unit adapted to capture an image using an image pickup element;
   a switch adapted to instruct the image capture apparatus to start a recording process of recording a captured image to a recording medium; and
   a control unit adapted to determine, using (a) a first exposure value indicating exposure of an image captured before the switch is operated, (b) a second exposure value indicating exposure of an image captured after the switch is operated, (c) a first white balance value indicating a white balance of an image captured before the switch is operated, and (d) a second white balance value indicating a white balance of an image captured after the switch is operated, whether to issue a warning to a user or not,
   wherein the warning allows the user to determine whether to store the captured image in the recording medium.

2. An image capture apparatus according to claim 1, wherein the captured image is not stored in the recording medium if the user chooses not to store the captured image in the recording medium when the warning is issued.

3. An image capture apparatus comprising:
   an image capture unit adapted to capture an image using an image pickup element;
   a switch adapted to instruct the image capture apparatus to start a recording process of recording a captured image to a recording medium; and
   a control unit adapted to determine, using a first white balance value indicating a white balance of an image captured before the switch is operated and a second white balance value indicating a white balance of an image captured after the switch is operated, whether to issue a warning to a user or not,
   wherein the warning allows the user to determine whether to store the captured image in the recording medium.

4. An image capture apparatus according to claim 3, wherein the captured image is not stored in the recording medium if the user chooses not to store the captured image in the recording medium when the warning is issued.

5. A method for controlling an image capture apparatus, the image capture apparatus including an image capture unit adapted to capture an image using an image pickup element; and a switch adapted to instruct the image capture apparatus to start a recording process of recording a captured image to a recording medium, the method comprising:
   a step of determining, using (a) a first exposure value indicating an exposure of an image captured before the switch is operated, (b) a second exposure value indicating an exposure of an image captured after the switch is operated, (c) a first white balance value indicating a white balance of an image captured before the switch is operated, and (d) a second white balance value indicating a white balance of an image captured after the switch is operated, whether to issue a warning to a user or not,
   wherein the warning allows the user to determine whether to store the captured image in the recording medium.

6. A method according to claim 5, further comprising a step of storing the captured image in the recording medium if the user chooses not to store the captured image in the recording medium when the warning is issued.

7. A method for controlling an image capture apparatus, the image capture apparatus including an image capture unit adapted to capture an image using an image pickup element; and a switch adapted to instruct the image capture apparatus to start a recording process of recording a captured image to a recording medium, the method comprising:
   a step of determining, using a first white balance value indicating a white balance of an image captured before the switch is operated and a second white balance value indicating a white balance of an image captured after the switch is operated, whether to issue a warning to a user or not,
   wherein the warning allows the user to determine whether to store the captured image in the recording medium.

8. A method according to claim 7, further comprising a step of not storing the captured image in the recording medium if the user chooses not to store the captured image in the recording medium when the warning is issued.

* * * * *